United States Patent [19]

Nichols

[11] Patent Number: 4,723,666

[45] Date of Patent: Feb. 9, 1988

[54] DISPLAY PANEL AND ASSEMBLY

[76] Inventor: David G. Nichols, 64 Boston Rd., Palmer, Mass. 01069

[21] Appl. No.: 928,789

[22] Filed: Nov. 10, 1986

[51] Int. Cl.$^4$ ............................................. A47B 47/00
[52] U.S. Cl. ..................................... 211/189; 211/13; 248/DIG. 2; 403/315; 403/331
[58] Field of Search ................. 248/DIG. 2; 211/189, 211/13, 169; 403/331, 381, 315; 16/87.2, 225, 271, 254; 160/228; 52/594, 270, 271

[56] References Cited

U.S. PATENT DOCUMENTS

| 792,979 | 6/1905 | Fulghum | 403/331 |
|---|---|---|---|
| 2,392,997 | 1/1946 | Prentice | 16/271 X |
| 2,630,303 | 3/1953 | Krucker | 403/331 X |
| 3,333,708 | 8/1967 | LeBlanc et al. | 248/DIG. 2 X |
| 3,351,208 | 11/1967 | Siegel | 248/DIG. 2 X |
| 3,441,975 | 5/1969 | Shepherd | 16/225 |
| 3,931,894 | 1/1976 | Murphy | 211/189 |
| 4,004,391 | 1/1977 | Keeton | 52/594 X |
| 4,199,070 | 4/1980 | Magnussen, Jr. | 211/189 X |
| 4,344,475 | 8/1982 | Frey | 16/225 X |
| 4,586,619 | 5/1986 | Eckert | 211/13 X |

FOREIGN PATENT DOCUMENTS

| 772675 | 8/1934 | France | 160/228 |
|---|---|---|---|
| 2495682 | 6/1982 | France | 16/225 |

Primary Examiner—Ramon S. Britts
Assistant Examiner—Blair M. Johnson
Attorney, Agent, or Firm—Barlow & Barlow, Ltd.

[57] ABSTRACT

A display has a plurality of interlocking panels. Each panel is joined to an adjacent panel by a lock section that includes a hinge to permit the panels to be angularly oriented with respect to each other. The lock section includes a longitudinal channel which engages the opposite edge of male portion of an adjacent panel and means are provided to prevent the panels from becoming disengaged.

1 Claim, 7 Drawing Figures

DISPLAY PANEL AND ASSEMBLY

BACKGROUND OF THE INVENTION

Display stands which can be used for a variety of purposes for displaying articles for sale have been constructed as a multi-sided revolving unit. When completely assembled, a multi-sided display requires considerable space and it is advantageous to have the display formed in such a way that the ultimate user, that is the retailer, may readily assemble the same. There have been several approaches to this general structure as, for example, that seen in the Murphy U.S. Pat. No. 3,931,894 where a plurality of identical panels are provided with an edge to edge snap-fit utilizing mating male and female hinge portions on adjacent edges. The hinge portions in Murphy are separated along the vertical edge and may separate. If separation occurs, the overall structure may come apart.

SUMMARY OF THE INVENTION

The display according to the present invention comprises a plurality of panels which have an area thereon with means for displaying and mounting objects. Each panel has one vertical edge formed as a male lock section and the opposite vertical edge formed with a flat hinge section, which is a thinned portion and with an outer thicker female lock section which is adapted to engage the male lock section on the adjacent joinable panel. In one embodiment, a pin is provided on the male lock section while an "L" shaped slot opening outward on one wall of a channel is provided on the female lock section so that when the two parts are engaged, a slight movement in the vertical direction will permit the pin to engage the lock and prevent the lateral movement of adjacent panels. In another form, the male lock section can be provided with a particular end formation which will engage in a slot in a female lock section, for example, the male section may be slightly enlarged, offset or configured in other forms to permit this structure. The result of this type of structure is to provide a display panel assembly that is substantially rigid and which will resist disassembly as might occur with a snap fit arrangement as is seen in some of the prior art.

DESCRIPTION OF THE PREFERRED EMBODIMENT

Figure 1:
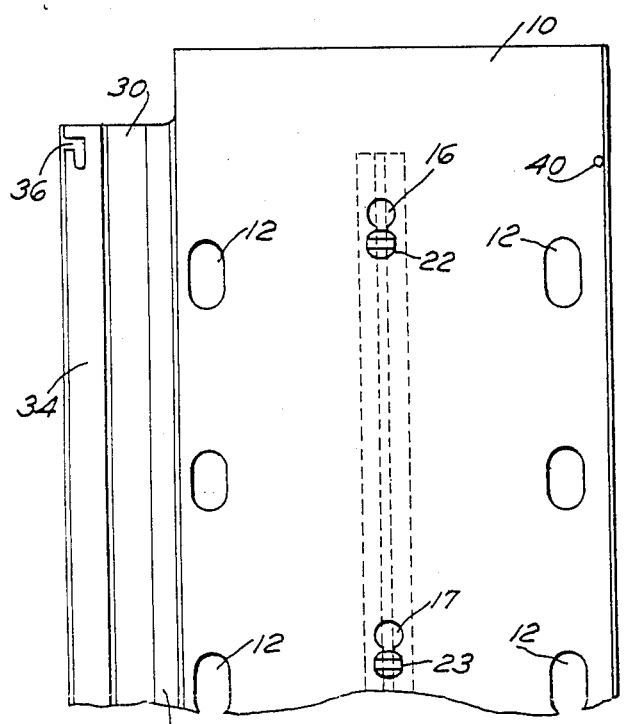
FIG. 1 is partial elevational view of a display panel made in accordance with the invention.
Figure 2:
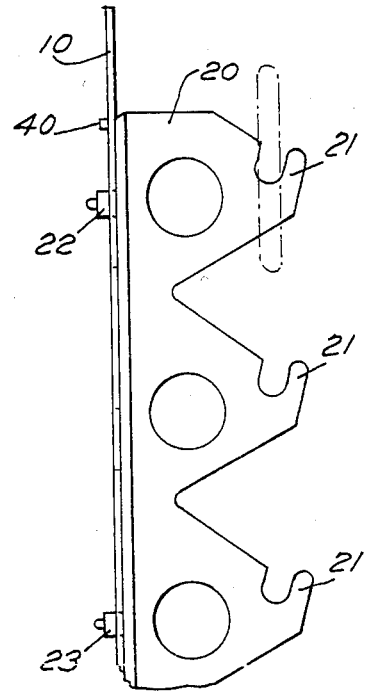
FIG. 2 is a side elevational view thereof showing one form of a display support for articles.
Figure 3:
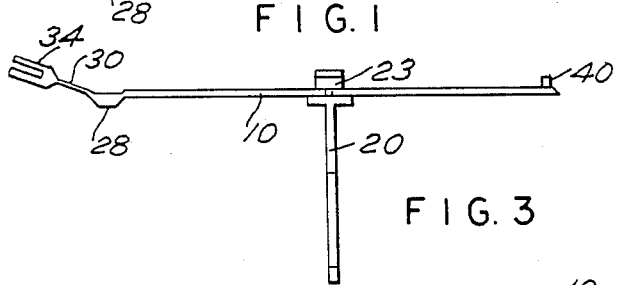
FIG. 3 is a top view.

Referring to FIGS. 1 and 3, a display panel 10 is illustrated which is substantially rectangular in configuration. The panel is preferably formed by injection molding and is illustrated as particularly adapted for displaying eyeglasses. To this end, the display panel has a plurality of uniformly spaced apertures 12 which are of a size to receive temples of eyeglasses. Medially of each panel, are a plurality of spaced bayonet slots 16, for example, which will accommodate the reception of a bridge support bracket 20, such as illustrated in FIG. 2. The bridge support bracket 20, has upwardly opening hooks 21 and is provided with rearwardly protruding pins 22, 23 that will engage in the bayonet slots 16, 17, for example, on the panel 10 and secure the bracket to the face of the panel.

Figure 4:
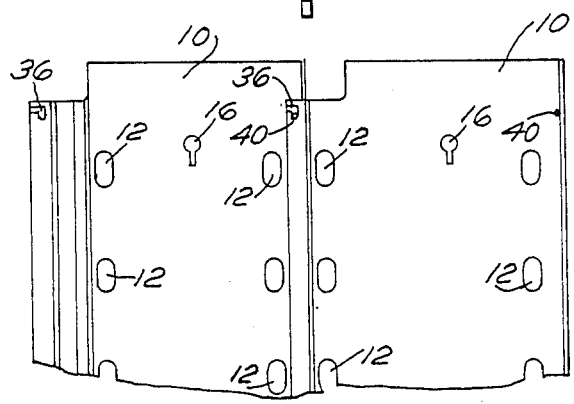
FIG. 4 is a view showing two adjacent display panels interconnected.

In accordance with a feature of this invention, one side edge of the panel is provided with a thinned section 30 which, in essence, is an integrally molded hinge element and this hinge section then terminates in a thicker enlarged locking section 34 which as seen in FIG. 3 is "U" shaped forming a channel. The locking section 34 is also provided with an "L" shaped slot 36 and this "L" shaped slot is arranged to engage a pin 40 that extends from the opposite edge of the panel 10 as seen in the assembled view of FIG. 4 where two adjacent panels are interlocked and the pin 40 is residing in the bottom of the "L" shaped slot 36. It will be noted by examining particularly FIG. 3, that the hinge section 30 is joined to the panel 10 by a stiff thicker section 28 which section imparts rigidity and strength to the edge to insure that the hinging will all take place at section 30. Also from an aesthetic standpoint, the section 28 provides a balanced look to the overall article.

Figure 5:
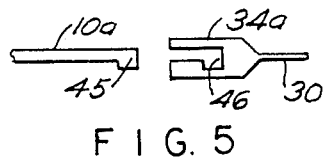
FIGS. 5, 6, and 7 are sectional views showing various forms of interconnection of adjacent display panels.
Figure 6:
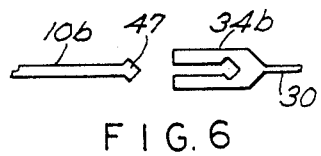
Figure 7:
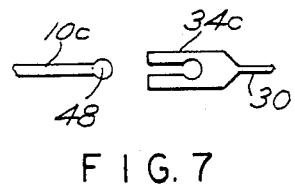

With reference to FIGS. 5, 6, and 7, there is illustrated other forms of edges that the display panels may take. Specifically, in FIG. 5, one edge of the display panel would be formed as an "L" shaped extrusion 45 while the portion 34a would be formed with a female "L" section 46. In FIG. 6, the panel 10b could be formed with an arrow shaped head 47 while the locking secton 34b would be formed with a female slot similarly configured. Also, in FIG. 7 the panel 10c could be formed with an enlarged rounded head 48 and the locking portion 34c would be formed with a slot having an inner end with the rounded receptacle portion.

I claim:

1. A display comprising a plurality of panels, each panel being formed with means to support articles and being hingedly joined to an adjacent panel by hinge means, said hinge means comprising a thin section terminating in a thicker lock section and being located on a first edge of each panel, said lock section having a longitudinal channel and one side of the channel having an L-shaped slot opening outward, the second and opposite edge of each panel having a pin protruding therefrom to engage the slot in said lock section.

* * * * *